United States Patent [19]

Westerman et al.

[11] Patent Number: 4,890,473
[45] Date of Patent: Jan. 2, 1990

[54] CONTRACTING RIM CLAMP

[75] Inventors: William J. Westerman, Columbia; Warren B. Depperman, Lugoff; Philip G. Smith, Jr., Camden, all of S.C.

[73] Assignee: Cogsdill Tool Products, Inc., Camden, S.C.

[21] Appl. No.: 192,864

[22] Filed: May 11, 1988

[51] Int. Cl.$^4$ ............................................. B21D 41/00
[52] U.S. Cl. ...................................... 72/402; 72/367; 269/43; 269/287; 228/49.3
[58] Field of Search ..................... 72/402, 121, 367; 269/43, 287; 228/44.5, 49.3

[56] References Cited

U.S. PATENT DOCUMENTS

| | | | |
|---|---|---|---|
| 3,602,031 | 8/1971 | Graff | 72/393 |
| 3,952,936 | 4/1976 | Dearman | 228/49 |
| 4,492,015 | 1/1985 | Dearman | 29/281.5 |
| 4,666,138 | 5/1987 | Dearman | 269/43 |

FOREIGN PATENT DOCUMENTS

| | | | |
|---|---|---|---|
| 437561 | 7/1974 | U.S.S.R. | 72/402 |
| 683874 | 9/1979 | U.S.S.R. | 228/49.3 |
| 893377 | 1/1982 | U.S.S.R. | 72/402 |

*Primary Examiner*—Daniel C. Crane
*Attorney, Agent, or Firm*—Harness, Dickey & Pierce

[57] ABSTRACT

A clamp encircles the outer rim of an out-of-round tubular pipe to reform the cross-section of same into one that is substantially round, the clamp including a ring frame, a plurality of pivotally mounted roller assemblies each having a roller to engage the pipe rim, and drive means for pivoting the roller assemblies such that the rollers simultaneously rotate to contract radially inwardly or outwardly relative to a circle defining the locus of pivot axes, the rollers describing first and second circles and being adapted to close into a circle having a diameter sized to engage the pipe, when inserted therein. The clamp can include multiple sets of separately adjustable roller assemblies.

21 Claims, 3 Drawing Sheets

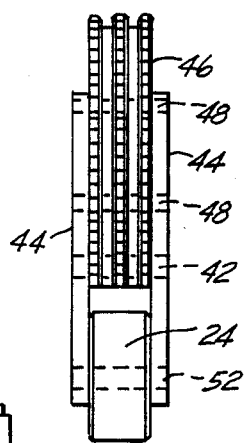
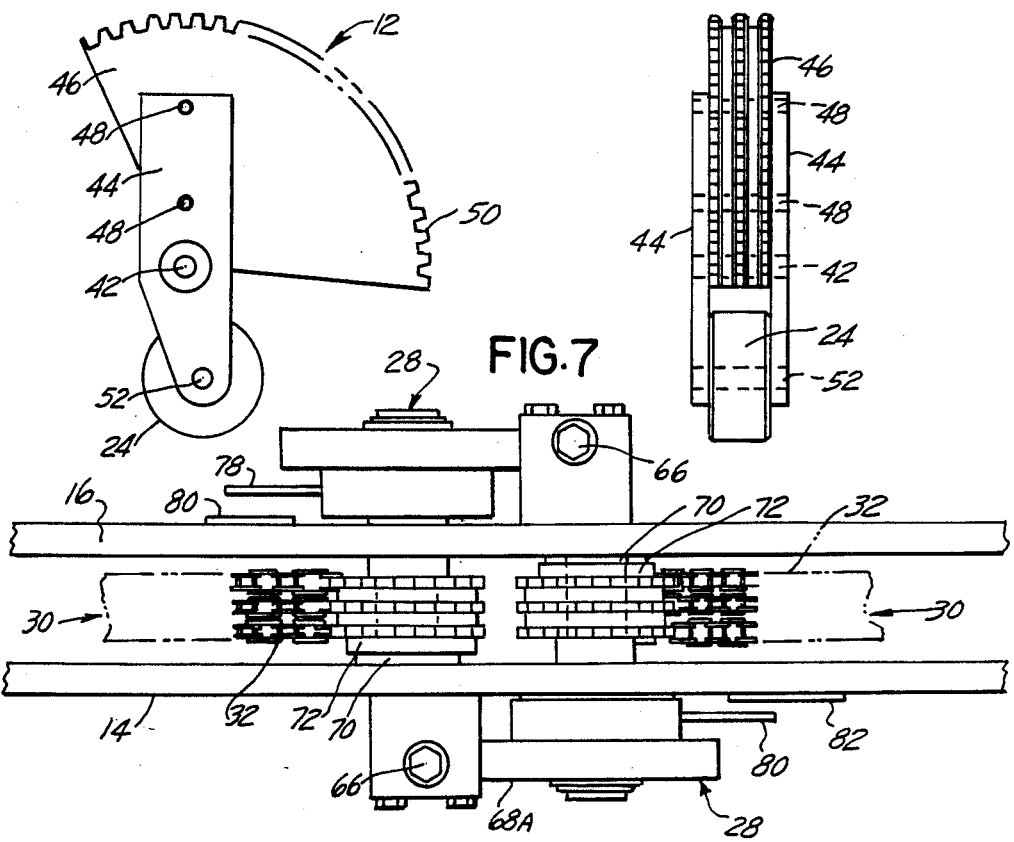
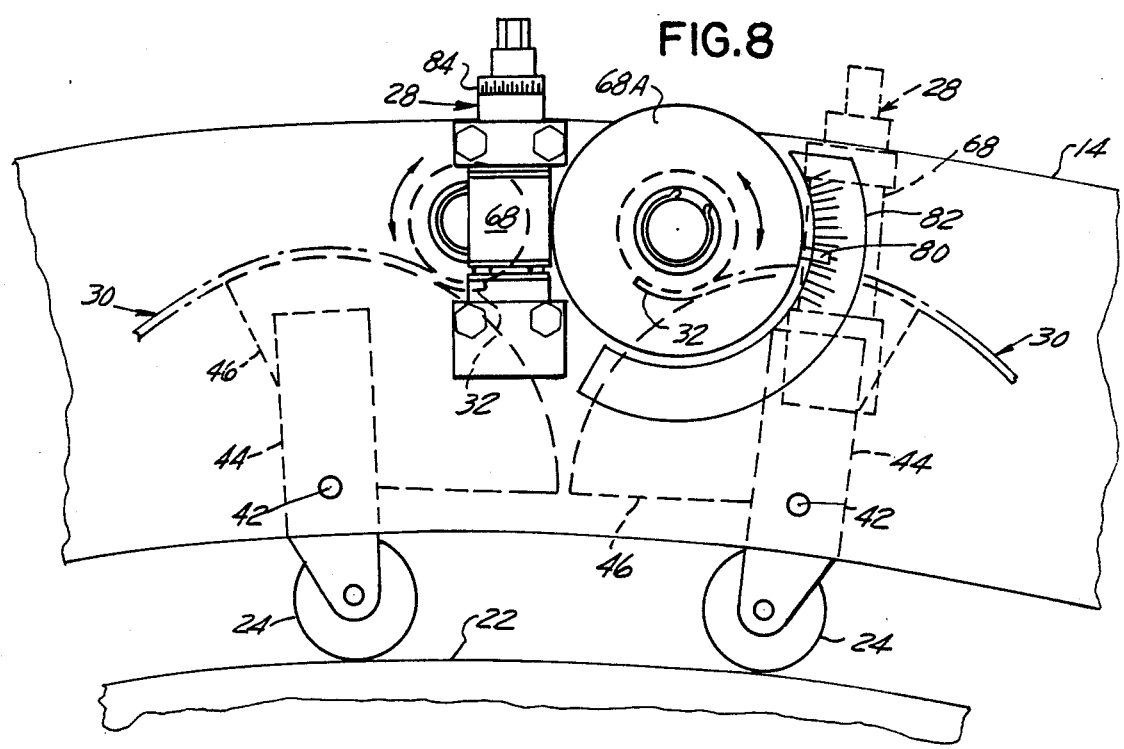

CONTRACTING RIM CLAMP

BACKGROUND AND SUMMARY OF THE INVENTION

This invention relates to a pipe reforming clamp provided with force applying members adapted to be positioned in encircling relation about the rim of a pipe having a noncircular cross-section and reform same to a circular cross-section and, in particular, to a clamp which simultaneously expands and/or contracts the members in such a manner that they rotate from a non-engaging first position defining a first circle and to a pipe engaging second position defining a second circle.

In typical pipe or cylindrical vessel fit-up clamps, the vessel may be made round by the use of a large number of individual adjusting screws each having its axis aligned with a radius from a longitudinal axis generally representing the pipe axis. Such an arrangement is shown in U.S. Pat. No. 3,952,936 issued Apr. 27, 1976. Separately adjusting these screws can be very time-consuming and even with great care it might be impossible to get the vessel rim truly round. Further, these screws cannot be rapidly reset for another like pipe of somewhat different diameter since the screws are set for a given pipe. It would be desirable to have a clamp which is not unduly time-consuming to use and reduces to a minimum the number of adjustments necessary to achieve roundness.

In this invention, a clamp is adapted to encircle the end portion of a pipe and comprises a rigid annulus having a circular inside opening defined by a diameter greater than the exterior diameter of the pipe to be encircled, and a plurality of generally equiangularly spaced, force applying assemblies each having a force applying portion and carried by the annulus, and a drive arrangement for driving the portions into and out of forcible engagement with the pipe exterior. In particular, the clamp is characterized by the annulus comprising a pair of unitary rings interconnected in parallel relation, the force applying assemblies being pivotally mounted between the rings each having a roller at an inward radial end and a toothed sprocket at an outward radial end, the pivot axes defining a circle the center of which generally centered with the pipe axis, and the drive arrangement including a drive chain connected to the assemblies for simultaneously pivoting the rollers from a first position defining a first circle to a second position defining a second circle, the two positions of the rollers defining concentric circles having the same center as the circle passing through the pivot axes. The drive chain is interconnected to the sprocket of each force applying assembly whereby driving movement of the chain will cause the rollers to pivot about their axes, simultaneously, causing the rollers to contract radially inwardly or expand radially outwardly to define the circles which will encircle and either engage or disengage with the pipe.

Further, an adjustment arrangement locally of individual force applying assemblies includes a sprocket wheel which is driven radially inward against the chain to change the inward radial position of each roller and thus change the relative positions of the rollers to each other. Thus the rollers could define a perfect circle, an ellipse or some other shape should it be desirable.

An advantage of such a clamp is the ability to achieve roundness in a pipe to be welded with a minimum of effort but with a maximum of diametral accuracy and to accommodate pipe of different diameters within the range of the clamp.

Another advantage of a clamp having a contracting opening is that a multitude of force applying members can be adjusted to a certain position relative to the others, such as where each roller is positioned to be tangent to a circle, then with the turning of a drive gear, the rollers will still define a circle, with great precision, over a wide range of diameters.

DETAILED DESCRIPTION OF THE DRAWINGS

The foregoing advantages will become more apparent when viewed in light of the accompanying drawings and following detailed description wherein:

FIG. 5 is a plan view of a roller assembly;

FIG. 6 is an end view of the roller assembly shown in FIG. 5;

FIG. 7 is a plan view taken along line 7—7 of FIG. 3 showing two of four worm gear assemblies mounted to the clamp;

FIG. 8 is a view of one of the worm gear assemblies, shown in FIG. 7, positioned in the clamp;

DETAILED DESCRIPTION OF THE PREFERRED EMBODIMENT

Figure 1:
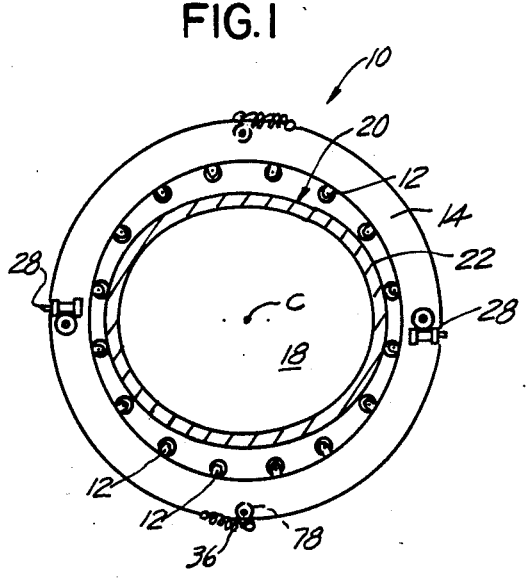
FIG. 1 is an elevational view of a contracting rim clamp constructed in accordance with the invention and encircling the end of an out-of-round pipe, the pipe being shown in section.
Figure 2:
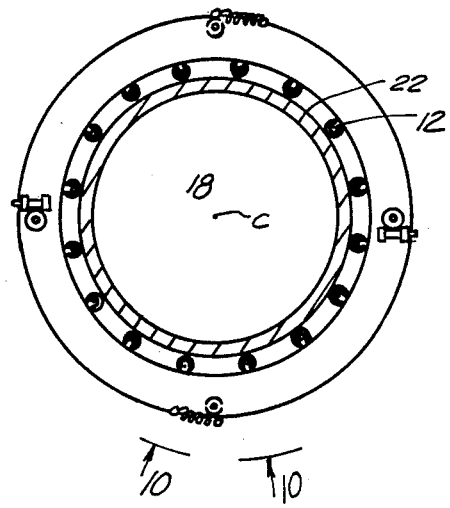
FIG. 2 is the same elevational view as that shown in FIG. 1 but showing the clamp forcing the pipe into a round cross-section for welding.

Turning now to the drawings, a contracting rim clamp 10 comprises a plurality of force applying assemblies 12 each pivotally mounted between a pair of thick, flat, annular rings 14 and 16, each ring having a circular interior opening 18 defined by a diameter "B" adapted to encircle the rim 22 of a tubular pipe 20 that is slightly out-of-round and each force applying assembly having a roller 24 adapted to be rotated into engagement with the rim. FIG. 1 shows the clamp being positioned about an out-of-round pipe with some of the rollers being in contact with the rim and other of the rollers being out of contact with the rim. FIG. 2 shows the force applying assemblies, after being pivoted, with the rollers 24 being rotated into contact with the rim. As will be described, the assemblies are simultaneously pivoted through the same angle "A" relative to a radius passing from the center "C" of the opening through the pivot axis of the respective roller assembly such that the locus of points described by the rollers, at any position rotated to, will define a circle the center of which is on the primary axis of the pipe.

The two circular rings 14 and 16 form a rigid frame to encircle the pipe with each ring having a central circular opening 18 defined by a diameter sized to encircle the pipe or tubular vessel being rounded, each ring being structurally strong enough to resist radial distortion when subjected to the reaction forces transferred by the roller assembly loads required to round the pipe. Disposed between the rings, in addition to the generally equiangularly spaced roller assemblies 12, are a plurality of idler assemblies 26 each being generally equiangularly spaced and disposed between a respective pair of roller assemblies 12, four adjustable worm gear assemblies 28, four link chains 30 each threadably inserted between a respective set comprised of the idler and roller assemblies with one end 32 of each chain being secured to one respective worm gear assembly, and eight springs 36 each having one end connected to a respective ring 14 or 16 and its other end connected to the other end 34 of a respective chain, the springs 36 providing tension in each respective chain. Adjustment of each worm gear assembly 28 draws the chain 30 which causes the roller assemblies 12 to pivot.

Spacers 38 extend between the two rings to physically hold the rings together and provide accurate lateral separation between the rings so that the roller, idler and worm gear assemblies and the internal hardware (e.g., chains) can be mounted therewithin. Each spacer is associated with an idler assembly and tapped to accept an adjusting screw 40 used by a respective idler assembly to assist in fine tuning the roundness of the clamp.

Figure 3:
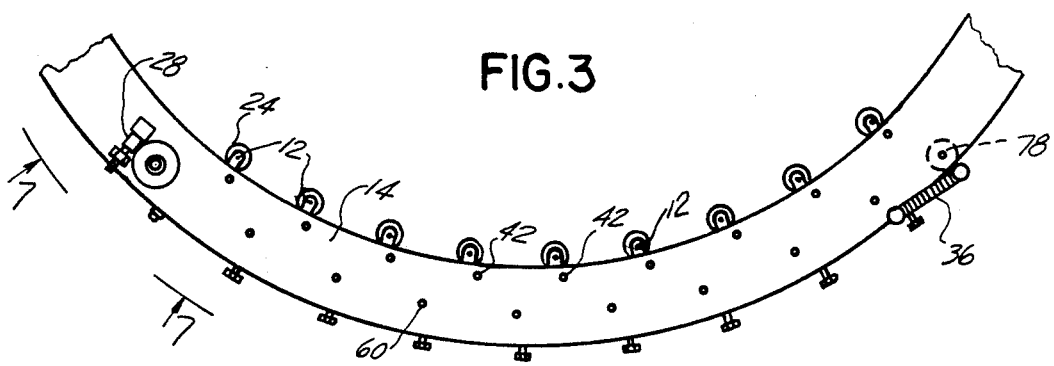
FIG. 3 is an enlarged plan view showing one quadrant of the clamp shown in FIG. 1.

FIG. 3 shows one quadrant of the contracting rim clamp with a chain and nine roller assemblies 12 being disposed between a worm gear assembly 28 and a spring 36. Each quadrant of the clamp would be similarly constructed so as to have a like number of roller assemblies 12 with the associated worm gear assemblies 28 being located at diametrical opposite positions to one another, and the spring members 36 being located at diametrical positions, but 90° to the worm gear assemblies. As such, thirty-six roller assemblies are provided. It is to be understood that more or fewer roller assemblies could be used as desired depending, for example, on the pipe diameter and pipe thickness. Further, a single chain extending between a worm gear assembly 28 and a spring member 36 could be used, depending on factors such as length and size of chain needed to pull on the roller assemblies or torque required by the worm gear assembly to draw the chain and pivot the roller assemblies.

Figure 4:
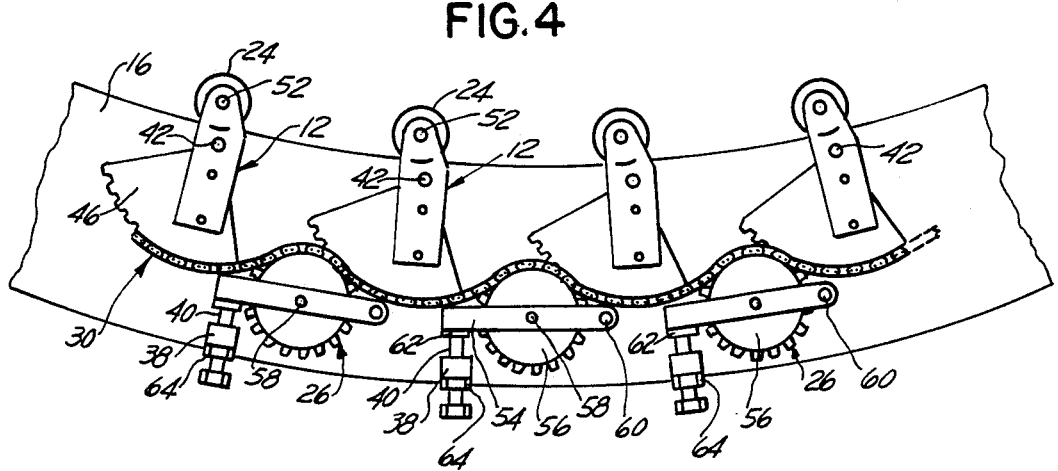
FIG. 4 is a view cutting away a portion of the clamp, shown in FIG. 3, to show detail of an idler assembly coacting with a chain for positioning a plurality of roller assemblies.
Figure 9:
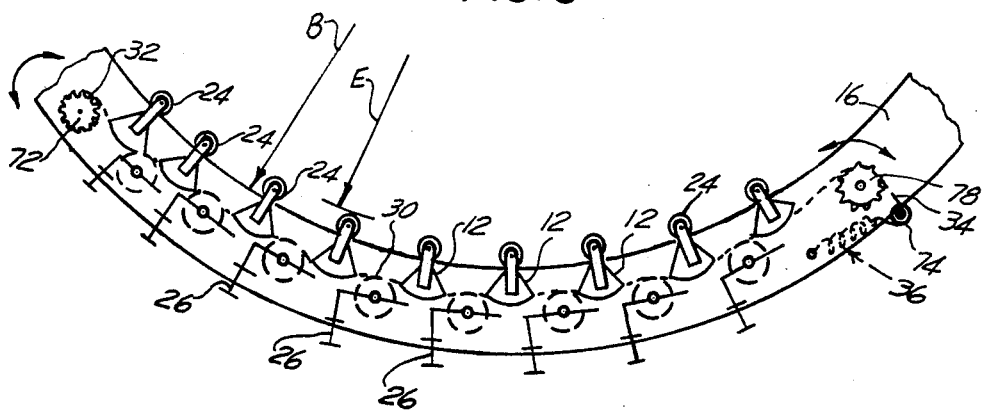
FIG. 9 is a cut away view showing a drive chain extending between a spring assembly and a worm gear assembly.
Figure 11:
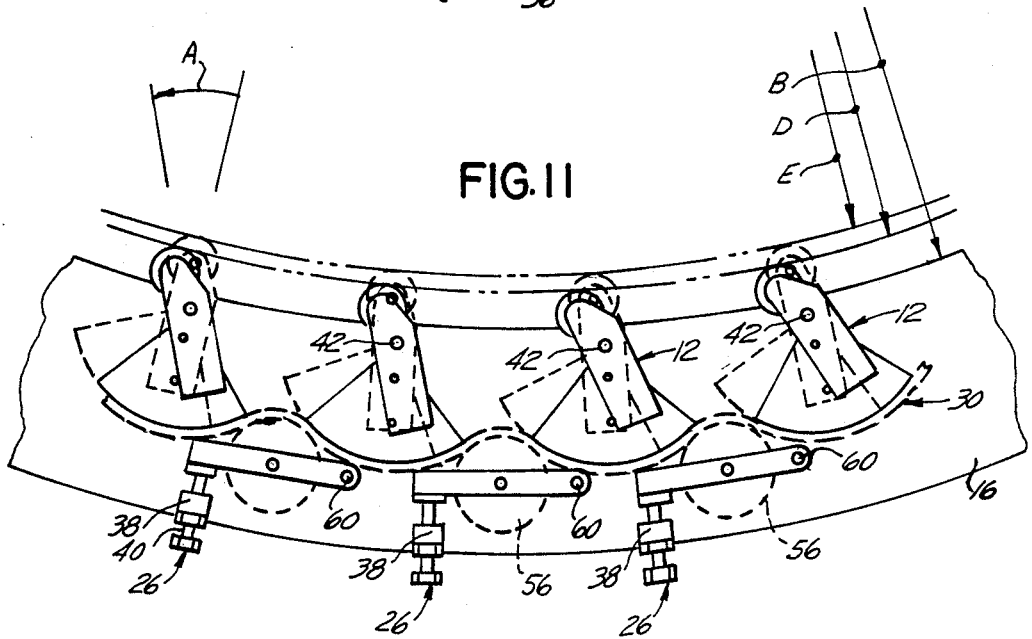
FIG. 11 is similar to FIG. 4 but showing the adjustment of the roller assemblies, in one quadrant of the clamp, such that the rollers pivot from a first position defining a first circle to a second position defining a second circle.

FIGS. 4 and 11 show a portion of the clamp 10 with one ring 14 being removed to show the chain 30 threaded between a group of roller assemblies 12 and their associated idler assemblies 26. The roller assemblies can each be adjusted to a certain position relative to one another, the most common position being one in which each roller 24 is positioned so as to be tangent to a circle. The rollers move radially inwardly/outwardly of the opening along a nonlinear path (i.e., rotate relative to their pivot pins 42) and the pivot pins and inward positions of the rollers define circles having a common center "C", generally positioned on the longitudinal axis through the pipe. Adjustment of the worm gear causes the chain to advance whereby the roller assemblies 12 will simultaneously pivot about their respective pivot pins and the rollers to define a new circle but having a different diameter relative to the center of the opening defined by the rings.

Referring to FIGS. 5 and 6, each roller assembly 12 includes a pair of roller arms 44 each spaced apart a distance sufficient to receive a sprocket segment 46 at one end and mount a roller 24 at the other end. The sprocket segment is a pie-shaped segment which is non-rotatably located between the arms by a pair of pins 48 each extending between the arms 44 which are subsequently welded to the sprocket segment 46, each segment having teeth 50 for engaging with individual links of a link chain 30. The roller 24 is mounted to the arms 44 by a pin 52 extending between the arms and is adapted to engage the outer periphery 22 of the pipe. Each roller assembly is held in place by a pin 42 passing through respective holes in the arms and corresponding holes in the rings such that each assembly can rotate about its respective mounting pin. The holes are drilled in the rings on a precisely-sized hole circle.

When the arms that carry the rollers are all pointed directly toward the center of the clamp (i.e., are aligned with a radius passing through the center of the opening), the inside surface of each roller will lie on a circle having a diameter "E" equal to the distance between the inside of any one roller and the roller 180° opposite thereto. This configuration defines the mathematical minimum diameter vessel that the clamp can contract to.

If the arms supporting the rollers are all rotated through a given angle, the inside surfaces of the rollers will still lie on a circle, but the diameter of the circle is much larger. The change in diameter dependent on the length of the arm supporting the rollers and the angle of rotation of these arms. In this manner, the device can contract on different diameter vessels and the points of contact with the vessel (i.e., the inside surfaces of the rollers) will always lie in a true circle. This allows the clamp to "round" out-of-round pipes having diameters which have variations (within the range of the clamp) without the user having to unnecessarily make a large number of independent adjustments.

The force applying member could also comprise a shoe-like member that is formed with an arcuate surface configured to fit the exterior curvature of the pipe.

In a preferred arrangement, the roller surfaces for compressing about the minimum pipe diameter "D" should position the arms at an angle "A" of about 10° from the radius line. When the roller surfaces are positioned for compressing the maximum pipe diameter "D", the arms are at an angle "A" of about 25° from the radius line. As the angle increases for accommodating larger diameter pipes, forces required to contract rise considerably possibly requiring thicker chains to avoid breaking. Of course, the maximum diameter "B" is defined by the opening of the rings.

Idler assembly 26 comprises two support beams 54, a toothed idler sprocket wheel 56 having its center pinned at 58 for rotation relative to the beams, and the threaded adjustment screw 40 journaled for radial advance in one respective spacer 38, the support beams 54 having one end secured to the rings by a pin 60 and their other ends welded to thrust plate 62. A lock nut 64 is provided on each adjusting screw to lock it in place when final adjustment is made. Fitted into the clamp, the teeth of idler sprocket wheel 56 engage chain 30 to eliminate any slack in the chain and assure that the chain will maintain its engagement with the teeth in the sprocket segments 46. Threadable advance of the screw 40 in its spacer radially inward will drive thrust plate 62 radially inward and cause support beams 54 to pivot about pin 60 thereby causing sprocket wheel 56 to move towards the chain. Outward radial advance of the screw operates to move the wheel outwardly. Each of the pins 60 are fixed and on a common circle having the axis as its center and pins 58 move as screw 40 is adjusted.

The idler sprockets 56 serve a dual function. First, they hold the chain in a position so that the chain wraps partially around and remains in contact with the sprocket segments 46. Second, the idler sprockets provide an arrangement for adjusting the position of one sprocket segment relative to another sprocket segment. As the idler sprockets move, the chain will move slightly, in a direction transverse to a radius passing through the pivot pin and center axis, and thus individually adjust the angular position of the roller assemblies 12, and thus that of the rollers 24. The idler assemblies do not directly apply reforming forces but allow individual and accurate adjustment of roller position.

Worm gear assembly 28 includes a worm 68 having a hexagonal driving head 66 which in turn is connected (not shown) in conventional fashion to a worm gear 68A which in turn is connected to a drive shaft 70 extending between the rings, the shaft having a toothed gear or take-up sprocket 72 mounted for rotation therewith. One end 32 of a respective link chain 30 is securely fastened, such as by welding, to a respective take-up sprocket so that rotation of worm 68 will rotate the shaft 70, the worm gear 68A and the toothed take-up sprocket 72, resulting in the chain being drawn in the direction of rotation of the toothed take-up sprocket.

Figure 10:
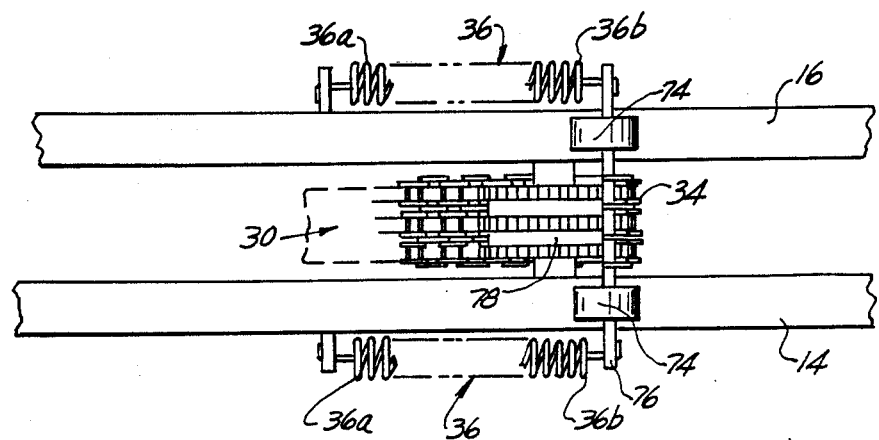
FIG. 10 is a plan view taken along line 10—10 of FIG. 2 showing a spring assembly.

Spring 36 eliminates slack in the respective chains. Shown best in FIG. 10, end 34 of the chain, a pair of springs 36 and a pair of rollers 74 are connected to a shaft 76 extending across the rings 14 and 16, each spring having one end 36a connected to one respective ring and its other end 36b connected to the shaft 76, each roller 74 mounted to one respective end of shaft 76 and positioned to roll about the outer circumference of one respective ring 14 or 16. A toothed freely rotatable idler sprocket wheel 78, mounted between the rings, engages a portion of the other end 34 of the chain 30 wrapped thereabout and extending to its securement to the shaft 76.

The chain 30 is positioned and tensioned as follows. One end 32 of the chain passes off the first sprocket segment 46 and is attached to a take-up sprocket 72 driven by the worm gear (see FIGS. 7 and 8). The opposite end 34 of the chain passes off the last sprocket segment around nonadjustable idler sprocket wheel 78 and is attached to a spring 36 that is anchored to the rim of the ring. (See FIG. 3) The spring keeps tension in the chain at all times, which maintains it in mesh with the idler sprockets 56 and the sprocket segments 46.

Initially, the clamp is adjusted by using the adjusting screws 40 that position the idler sprockets so that all roller support arms 44 are set in exactly the same angle "A" from the center of the clamp. Once this is done, the rollers 24 will describe a true circle regardless of the diameter setting.

As the take-up sprocket 72 is rotated by the worm gear 68A in the direction to close the clamp, it pulls the chain 30 around the ring, and the sprocket segments 46 rotate the roller support arms 44 so that they point more towards the center. This reduces the distance between diametrically opposite rollers 24 to effectively reduce the opening in the rings. When the take-up sprocket is rotated in the opposite direction, the chain is pulled around the clamp in the opposite direction by the tensioning springs 36. The sprocket segments and roller support arms rotate in the opposite direction, which moves the rollers away from the center of the clamp and thereby increases the effective diameter opening. Even though the diameter of the opening changes, the inside surfaces of the rollers which contact the vessel will always describe a "perfect circle". Thus, vessels having diameter variations and/or portions which are slightly out-of-round, such as could be caused by manufacturing tolerances, can be compressively clamped about and forced into "round" with one simple adjustment.

When using four worm gear assemblies 28, the user must rotate the sprockets 46 and 56 of the roller-idler assemblies, and drive that respective take-up sprocket 72 and chain 36, through the same given angle. This is accomplished by putting a pointer 80 on drive shaft 70 that supports the take-up sprocket 72 and placing a protractor-like scale 82 under the pointer. When all quadrants are adjusted to the minimum size, the pointers are set to read the same value on the protractor scale. To adjust to a different diameter, the user adjusts the worm gear assemblies until all four pointers are set to the new value on the protractor scale that corresponds to the desired diameter. It should be appreciated that the protractor scale, in combination with the spring, can be used to correlate with the compressive forces applied to the pipe. As shown in FIG. 8, a vernier scale 84 can be attached to worm 68 for greater precision.

In addition to reforming a pipe cross-section from a noncircular cross-section into one which is circular, the clamp herein can also be used in applications wherein a pipe to be welded must be round after a load is applied across a horizontal diameter (e.g., a weight or load is hung on the pipe). Such load can be of sufficient magnitude to substantially deform rings 14 and 16 which form the frame of the clamp. In such situation the roller assemblies are adjusted to a predetermined noncircular configuration. The clamp is positioned about the pipe and the roller assemblies adjusted with the worm gear assemblies so that the pipe end to be welded is slightly oval but circumferentially supported by the rollers, whereupon the load is applied. At this point the pipe supports the weight and the clamp supports both, and the total assembly deflects such that the pipe becomes round. This is highly advantageous in situations where the pipe is inadequate to support the weight (e.g. would collapse) and thus the contracting rim clamp allows the welding to be accomplished. In one example, an 8-foot diameter pipe having a 0.375 inch ($\frac{3}{8}$") wall thickness was made round after a 3,000 pound load was applied.

While it will be apparent that the preferred embodiment of the invention disclosed is well calculated to provide the advantages and features above stated, it will be appreciated that the invention is susceptible to modification, variation and change without departing from the proper scope or fair meaning of the subjoined claims.

What I claim is:

1. Apparatus to encircle and reform the cross-section of a tubular pipe, said apparatus comprising a frame having an opening greater than the outer periphery of the pipe to be encircled, a plurality of angularly spaced force applying assemblies pivotally mounted on said frame with each including a force applying member, drive means including a chain connecting each of the force applying assemblies together for driving the force applying member of each assembly into engagement with the outer periphery, and idler means disposed between a pair of said assemblies for movement radially inwardly against the chain, said idler means and chain being operable independently of one another and each simultaneously pivoting each assembly such that the force applying members move inwardly of the opening and relative to one another from a nonengaging first position relative to the pipe and to a pipe engaging second position, the members at said second position engaging the periphery and applying inward radial forces for reforming the cross-section of the pipe.

2. The apparatus as recited in claim 1 wherein each said position defines a first and second circle interiorly of the opening, said pipe cross-section being reformed from one that is slightly out-of-round to one that is round.

3. The apparatus as recited in claim 1 wherein the force applying members move along a nonlinear path between said positions.

4. The apparatus as recited in claim 1 wherein each said force applying assembly includes an arm having opposite end portions and mounted to the frame by a pin intermediate of said end portions, one end portion being connected to the chain and the other end portion being connected to said force applying member, the respective pins of said force applying assemblies being located on a circle having its center on the axis of the pipe.

5. The apparatus as recited in claim 4 wherein said chain is a link chain, and said one end portion is a toothed sprocket which engages respective of the links.

6. The apparatus as recited in claim 5 wherein said chain has opposite end portions, and further including bias means connected to the frame and to one end portion of the chain for resisting circumferential movement of the chain, and an adjustable drive member connected to the frame and the other end portion of the chain for pulling the chain in a direction away from said bias means.

7. The apparatus as recited in claim 1 wherein said force applying member comprises a rotatably mounted circular roller to engage the exterior curvature of the pipe.

8. The apparatus as recited in claim 1 wherein said force applying member comprises a shoe formed with an arcuate surface configured to fit the exterior curvature of the pipe.

9. The apparatus as recited in claim 6, characterized by a pair of drive means each comprising a chain, bias means, and an adjustable drive member, each said drive means being associated with a respective set of force applying assemblies and operable independently of one another to pivot the force applying assemblies of its set.

10. The apparatus as recited in claim 9 wherein the frame of said apparatus comprises an annular ring which includes four quadrants each quadrant including a set of force applying assemblies and a drive means to drive the respective set of force applying assemblies.

11. The apparatus as recited in claim 9 wherein a first and a second pair of drive members are 180° from one another and said bias means comprises two pairs of spring members, the respective spring member pairs being connected to the frame at locations 180° from one another and 90° from the drive members.

12. The apparatus as recited in claim 1 wherein said idler means comprises a toothed, freely rotatable, generally circular idler sprocket being mounted to the frame adjacent each end of the chain such that the chain is partially wrapped about each idler sprocket.

13. The apparatus as recited in claim 14 wherein the idler means comprises a support beam having one end pivotally mounted to the frame, a toothed wheel rotatably mounted to the beam, and means for driving the support beam radially inward and the wheel against the chain, thereby causing adjacent force applying assemblies to pivot relative to other force applying assemblies.

14. A clamp for making circular the cross-section of a noncircular tubular pipe which is positioned in an opening of the clamp, the center of the opening being on an axis generally adapted to register with the center axis of the pipe, comprising a plurality of force applying assemblies arranged angularly around the axis for applying a radial thrust generally towards said center axis, each force applying assembly being pivotally mounted to the clamp and including a roller adapted to pivot into engagement with the pipe in the opening, and idler wheel means spaced between at least two of the force applying members for pivoting and incrementally advancing the rollers centrally of the opening and into engagement with the pipe the rollers advancing along a path not aligned with a constant radius through its roller.

15. The clamp as recited in claim 14 further characterized by drive means operable independently of the idler means for simultaneously pivoting each of the force applying assemblies, said drive means having a separately adjustable drive member for adjusting the force applying members of its respective set.

16. The clamp as recited in claim 14 wherein each said force applying assembly pivots between 10° to 30° relative to a radius extending from the center axis through the pivot point.

17. The clamp as recited in claim 14 wherein said each force applying assembly includes a toothed sprocket segment at one end, and said drive means includes a link chain connected to each of the sprocket segments, a spring having one end connected to the frame and its other end connected to the chain for pulling the chain in a first direction, and a worm gear assembly including a toothed gear engaging the chain for drawing the chain in a second direction opposite to the first direction.

18. A method of forming a circular cross-section at the end of a tube having an exterior cross-section that is slightly out-of-round, comprising the steps of positioning the tube end in the central opening of a ring, pivotally mounting a plurality of force applying assemblies to the ring such that each assembly has a driving end and a driven end, respectively, spaced from and disposed in the opening, each end being adapted to rotate relative to the pivot, interconnecting each of the driving ends with an elongated member adapted to advance transversely of the assemblies, mounting an idler member to the ring between selective of the assemblies such that the idler member is in contact with a portion of the elongated member, advancing the elongated member and simultaneously pivoting each of the assemblies such that the driven ends rotate from a first position, not engaging the pipe, to a second position engaging the pipe, the locus of points of the driven ends at each said position, respectively, being on a first and second circle and, as desired or depending on the exterior tube advancing selective of the idler members radially inward against the elongated member, thereby causing the elongated member and at least one assembly to move relative to the opening.

19. A clamp for making circular the cross-section of a noncircular tubular pipe which is positioned in an opening of the clamp, the center of the opening being on an axis generally adapted to register with the center axis of the pipe, comprising a plurality of force applying assemblies arranged in intervals around the axis for applying a radial thrust generally towards said center axis, each force applying assembly being pivotally mounted to said clamp and including a toothed sprocket segment at one end and a roller at the other end adapted to engage the pipe in the opening, and drive means spaced from the force applying members for pivoting and incrementally advancing the rollers centrally of the opening and into engagement with the pipe the rollers advancing along a path not aligned with a constant radius through its roller, said drive means including a link chain connected to each of the sprocket segments, a spring having one end connected to the clamp and its other end connected to the chain for pulling the chain in a first direction, and a worm gear assembly including a toothed gear engaging the chain for drawing the chain in a second direction opposite to the first direction.

20. The clamp as recited in claim 19 including a pair of generally flat rings, and a plurality of spacers securing the rings together in spaced apart relation, the force applying assemblies and drive means being mounted to the clamp in the space between the rings, and said drive means comprises a chain interconnecting each of the assemblies, a drive assembly connected to one end of the chain for driving the chain in a first direction, and a spring connected to the other end of the chain for constantly drawing the chain into tight engagement with the force applying assemblies independently of the direction of movement of the chain caused by the drive assembly.

21. A clamp for making circular the cross-section of a noncircular tubular pipe which is positioned in an opening of the clamp, the center of the opening being on an axis generally adapted to register with the center axis of the pipe, comprising a pair of generally flat rings secured together in spaced apart relation, a plurality of force applying assemblies pivotally mounted to the clamp and arranged in intervals around the axis for applying a radial thrust generally towards said center axis, the force applying assemblies and drive means being mounted to the clamp in the space between the rings, a chain interconnecting each of the assemblies, a drive member connected to one end of the chain for pulling the chain in a first direction, a spring connected to the other end of the chain for constantly drawing the chain into tight engagement with the force applying assemblies independently of the direction of movement of the chain caused by the drive assembly, and an idler sprocket spaced from a pair of force applying members and movable inwardly against the chain for pivoting and incrementally advancing the inward end of the force applying assemblies into engagement with the pipe along a path not aligned with a constant radius through the center of the rings.

* * * * *

UNITED STATES PATENT AND TRADEMARK OFFICE
CERTIFICATE OF CORRECTION

PATENT NO.   : 4,890,473

DATED        : January 2, 1990

INVENTOR(S)  : Westerman, et al.

It is certified that error appears in the above-identified patent and that said Letters Patent is hereby corrected as shown below:

Column 8, line 6, Claim 13, dependent on "Claim 14" but should be dependent on --Claim 12--.

Signed and Sealed this

Twenty-fifth Day of June, 1991

Attest:

HARRY F. MANBECK, JR.

*Attesting Officer*

Commissioner of Patents and Trademarks